UNITED STATES PATENT OFFICE.

HERBERT WRIGLEY AND HOWARD SPENCE, OF MANCHESTER, ENGLAND, ASSIGNORS TO PETER SPENCE & SONS, LIMITED, OF MANCHESTER, LANCASTER, ENGLAND.

PREPARATION OF TITANIUM COMPOUNDS.

1,338,473.     Specification of Letters Patent.     Patented Apr. 27, 1920.

No Drawing.     Application filed February 4, 1919. Serial No. 275,014.

*To all whom it may concern:*

Be it known that we, HERBERT WRIGLEY and HOWARD SPENCE, subjects of the King of Great Britain and Ireland, and residents of Manchester, in the county of Lancaster, England, have invented certain new and useful Improvements in the Preparation of Titanium Compounds, of which the following is a specification.

For the manufacture of compounds of titanium the mineral ilmenite affords a convenient source of titanic acid, but this mineral is only with difficulty brought into a soluble condition by direct attack with sulfuric acid by the methods hitherto usually employed. These consist, broadly, in treating the ground mineral with concentrated sulfuric acid or alkali-bisulfate in quantity approximately chemically equivalent to the quantity of mineral employed, allowing, of course, for loss of acid by volatilization during the operation, and the desired degree of acidity in the resulting product, and gradually increasing the concentration and temperature as the reaction proceeds until a more or less solid, or a dry fritted mass, of mixed sulfates is obtained, which mass is afterward lixiviated to obtain solutions. This method of attack offers serious objections on account of the nature of the plant required, the fume evolved and the costs in manipulation and material. According to other known methods, the ilmenite is treated with such a large quantity of sulfuric acid or other dissolving agent as to obtain a practically complete solution of the mineral in a single operation, but such methods necessitate the use of a considerable excess of dissolving agent with consequent loss of the dissolving agent or expense in recovery of the excess.

Now we have found that we may much more readily and economically obtain the desired decomposition of ilmenite and can also obtain the simultaneous or direct solution thereof without the use of a large excess of sulfuric acid as the initial stage in the preparation of titanium compounds in commercial form, by heating the mineral and sulfuric acid by means of injected steam. By so heating the mineral and acid and regulating the condensation of the steam, we are able to obtain solution of the titanium and iron sulfates as they are formed, and also to maintain the strength and temperature of the solution for the necessary time in or about the condition most conducive to rapidity of attack, by which means we avoid anything in the nature of furnacing operations, with the concurrent advantages of economy in plant, in the conditions of work and the costs of the operation. In effecting the solution of the ilmenite by our process, we may with advantage employ, as is already known in other processes, in each operation a quantity of ilmenite greatly in excess of the amount theoretically required by the quantity of acid employed, and thereby substantially shorten the time necessary to obtain the desired degree of neutralization of the acid.

We may, as an example, operate as follows:—In a suitable vessel, well insulated to avoid much loss of heat and prevent undue condensation, a quantity of acid at a specific gravity of about 1.75 is brought to a temperature of about 160–170° C. by the injection of steam, which may, if desired, be superheated in order to control the duration of attack. A quantity of ground ilmenite is added which may suitably be about two or three times the theoretical equivalent of the acid employed. We thereafter continue agitation and heating with injected steam until the required degree of neutralization is obtained, which, depending upon the purpose or purposes for which the solutions are intended, may be substantially neutral, basic, or acid, as desired. During the operation, a gradual reduction of temperature and specific gravity by a regulated condensation of steam is allowed to take place. We then dilute the charge to the desired extent, settle, or otherwise separate the clear liquor, and employ the undissolved residue anew so far as is desirable with the addition of further mineral for the neutralization of the next charge of acid.

Instead of employing the ilmenite in a ground state, we may quite suitably employ it in lump form and circulate the acid through it by the injected steam employed for heating or by known means. For this purpose we may employ the mineral in pieces which may, for example, suitably vary from about half an inch to several inches in size, allowing free percolation of the liquors therethrough. The quantity of ilmenite thus employed in lump form may be many times the quantity chemically equivalent to the acid employed in each operation. The liquors thus obtained are largely free from sediment without further treatment.

The clear neutral, basic, or acid liquors obtained by the process are in themselves for certain purposes in the arts, either before or after the removal of a proportion of the iron by crystallization as hydrated ferrous sulfate, useful solutions of titanium sulfate containing iron sulfate and are also economical starting liquors for the preparation of other compounds of titanium. For the preparation of titanous solutions we now reduce the clear solutions by means of metallic iron (as is already known) under suitable conditions of temperature and specific gravity until all, or practically all, the tetravalent titanium in solution is reduced to trivalent form, and then by adjusting the specific gravity and temperature we eliminate the maximum proportion of the contained iron by crystallization as hydrated ferrous sulfate and concurrently thereby increase the percentage of titanium in the liquor, thus obtaining as a valuable by-product a very large proportion not only of the original iron oxid in the mineral, but also of the metallic iron employed in the reduction. We may, if desired, carry out this operation by means of successive crystallizations, and usually we prefer to operate in this way. In conjunction with the removal of iron by crystallization, we may, if necessary, strengthen the solution by evaporation or by the further solution therein of metallic iron with or without the addition of more sulfuric acid. We may thus readily reduce the proportion of iron in solution to an amount equivalent to a ratio of one molecule FeO to about one molecule $Ti_2O_3$ or lower.

For many purposes in the arts, for example as a powerful reducing agent, a titanous sulfate liquor prepared as described is quite suitable, but in order to obtain greater freedom from iron and increased concentration, we may further proceed to subject the liquor to a low temperature or refrigeration by known means whereby we are able to effect the removal of an additional material quantity of hydrated ferrous sulfate crystals. We may thus readily reduce the proportion of iron in solution to a ratio of about one molecule FeO to about 1.5 to 2 molecules $Ti_2O_3$. These solutions may also suitably serve as starting liquors for the preparation of other titanium compounds.

To the unrefrigerated or refrigerated solutions of titanous sulfate we may add, according to the desired use, a proportion of other suitable acids, such as, for example, hydrochloric, hydrofluoric or oxalic acid, or by double decomposition with suitable salts of these or other acids we may remove or replace a proportion of its sulfuric acid.

It will be understood that we do not confine ourselves to the precise details of the examples given, which are afforded for the purpose of illustration only, and that we may carry out the process or operations in or by any convenient means and in any convenient manner.

What we claim as our invention, and desire to secure by Letters Patent is:—

1. The process of obtaining solutions of titanium and iron directly from ilmenite which comprises heating a mixture of ilmenite and sulfuric acid by the injection of steam directly thereto.

2. The process of obtaining acid, neutral or basic solutions of titanium and iron directly from ilmenite by treatment with sulfuric acid, which comprises heating the mineral and acid by means of injected steam and regulating the condensation of the steam to effect a gradual reduction in temperature and specific gravity.

3. Process of obtaining acid, neutral or basic solutions of titanium and iron directly from ilmenite by treatment with sulfuric acid, which comprises heating the mineral and acid by means of injected steam; regulating the condensation of the steam to effect a gradual reduction of temperature and specific gravity; then diluting the charge and separating the clear liquor.

4. In the process of obtaining solutions of titanium sulfate by treating ilmenite with a dissolving agent, the step which consists in removing iron from the solutions by crystallization as hydrated ferrous sulfate.

5. In the process of obtaining solutions of titanium sulfate by treating ilmenite with a dissolving agent, the step which consists in removing iron from the solutions by successive crystallizations as hydrated ferrous sulfate.

6. In the process of obtaining solutions of titanium sulfate by treating ilmenite with a dissolving agent, the step which consists in subjecting the solutions to a low temperature to remove iron from the solutions as hydrated ferrous sulfate crystals.

7. In the process of obtaining solutions of titanium sulfate by treating ilmenite with a dissolving agent, the step which consists in removing iron from the solutions by crystallization as ferrous crystals and then subjecting the solutions to a low temperature to effect a further elimination of hydrated ferrous sulfate crystals.

8. The process of obtaining solutions of titanium and iron directly from ilmenite, which comprises adding ilmenite to sulfuric acid, in quantities greater than the theoretical chemical equivalent of the acid employed, and heating the mixture by the injection of steam directly thereto.

9. The process of obtaining solutions of titanium and iron directly from ilmenite, which comprises adding ilmenite to sulfuric acid, having a specific gravity of about 1.75 and in quantities greater than the theoretical chemical equivalent of the acid employed, and heating the mixture by injection of steam directly thereto.

10. The process of obtaining solutions of titanium and iron directly from ilmenite, which comprises adding ilmenite to sulfuric acid, in quantities greater than the theoretical chemical equivalent of the acid employed, agitating the mixture and heating the same by the injection of steam thereto, until any required degree of neutralization is obtained.

11. The process of obtaining solutions of titanium sulfate which comprises heating a mixture of ilmenite and sulfuric acid by the injection of steam directly thereto, and then removing the iron from the resulting liquor by the crystallization of the iron as a sulfate.

12. The process of obtaining solutions of titanium and iron directly from ilmenite which comprises heating a mixture of ilmenite and a dissolving agent by the injection of steam directly thereto.

13. The process of obtaining solutions of titanium and iron directly from ilmenite which comprises adding ilmenite to a solvent therefor in quantities greater than the theoretical chemical equivalent of the solvent employed, and heating the mixture by the injection of steam directly thereto.

14. The process of obtaining a solution containing titanium which comprises heating a mixture of a substance containing titanium and a solvent therefor by the injection of steam directly thereto.

15. The process of obtaining a solution containing titanium which comprises adding a substance containing titanium to a solvent therefor in amounts greater than the theoretical chemical equivalent of the solvent employed, and then heating the mixture by the injection of steam directly thereto.

In witness whereof we have hereunto set our hands.

HERBERT WRIGLEY.
HOWARD SPENCE.